United States Patent [19]

Belenky et al.

[11] 3,770,425
[45] Nov. 6, 1973

[54] WELDING ELECTRODE FOR CONTINUOUS WELDING

[76] Inventors: Alexandr Mikhailovich Belenky, ulitsa Lyadovo, 9, kv. 129, Kazan; Viktor Evgenievich Lazko, 10 Prospekt, 27a, kv. 23, Moscow; Alexandr Mikhailovich Toschev, ulitsa Gagarina, 63, kv. 80, Kazan; Ilgiz Ganeevich Bikmametov, Shkolny pereulok, 2, kv. 14, Kazan; Vladimir Kirillovich Vilkov, ulitsa Proizvodstvennaya, 12, kv. 18, Kazan; Nikolai Alexandrovich Mosendz, ulitsa Filatova, 1/22, kv. 16, Kiev; Galina Mikhailovna Yakushina, ulitsa Komsomolskaya, 25, kv. 42, Reutovo; Mikhail Vasilievich Poplavko-Mikhailov, Maly Pionersky pereulok, 5, kv. 156, Moscow, all of U.S.S.R.

[22] Filed: July 15, 1971

[21] Appl. No.: 163,053

[52] U.S. Cl. .............................. 75/128 A, 75/128 W
[51] Int. Cl. ............................................. C22c 39/20
[58] Field of Search ...................... 75/128 A, 128 W

[56] References Cited
UNITED STATES PATENTS

| 2,147,123 | 2/1939 | Emmons | 75/128 A |
| 2,880,085 | 3/1959 | Kirkby | 75/128 W |
| 3,574,602 | 8/1971 | Gondo | 75/128 A |
| 3,600,160 | 8/1971 | Simcoe | 75/128 W |

*Primary Examiner*—Hyland Bizot
*Attorney*—Eric H. Waters et al.

[57] ABSTRACT

A continuous welding electrode for welding low- and medium-alloyed high-strength steels which comprises in percent by weight carbon 0.18–0.25, manganese 2.5–3.5, silicon 0.4–0.8, chrome 1.5–2.0, nickel 1.0–1.3, tungsten 0.9–1.3, molybdenum 0.4–0.5, balance iron and provides for making high-strength weld joints having high impact strength at a temperature of up to −100°C.

1 Claim, No Drawings

WELDING ELECTRODE FOR CONTINUOUS WELDING

The present invention relates to continuous welding electrodes for welding of low- and medium-alloy high-strength steels.

Known in the art is a continuous welding electrode used for welding high-strength steels and providing for ultimate strength of the weld joint of about 190 kg/cm$^2$ at an impact strength $a_n = 5$–$6$ kgm/cm$^2$ when the articles are operated at a temperature of from $-40°$ to $+20°C$.

The known welding electrode comprises the following components (percentages by weight):

$$C = 0.18\text{--}0.25$$
$$Mn = 0.8\text{--}1.3$$
$$Si = 0.9\text{--}1.2$$
$$Cr = 1.5\text{--}2.0$$
$$Ni = 1.0\text{--}1.3$$
$$W = 0.9\text{--}1.3$$
$$Mo = 0.4\text{--}0.5$$
$$P \leq 0.02 \quad \text{undesirable impurities}$$
$$S \leq 0.02 \quad \text{present in the electrode}$$

Fe constituting the remainder

When effecting a welding process by means of the known continuous welding electrode, the weld joint is characterized by a coarse-grained cast structure with a high degree of chemical inhomogeneity. In this case there also occurs a considerable integration of the grains near the weld joint due to the overheating associated with the process of welding and this results in sharp reduction of the impact strength in the joint and adjacent zone and a danger is increased of breakdown of the weld joint at a temperature below $-40°C$.

In the process of welding hard-welded steels by the continuous welding electrode of the known composition, hot and cold cracks are often formed. To avoid the possibility of forming the cracks, the articles to be welded are preliminarily heated.

The known continuous welding electrode provides for high-quality weld joints only during the welding in an atmosphere of inert gases and non-oxidizing passive fluxes. The joints welded in a medium of carbon dioxide are contaminated with non-metallic inclusions and this reduces the plastic and viscous properties of the weld joints.

An object of the present invention is to provide a continuous welding electrode providing for high-strength weld joints having a high impact strength at a temperature of up to $-100°C$.

Another object of the invention is to provide a continuous welding electrode eliminating formation of hot and cold cracks in the weld joints.

Still another object of the invention is to reduce the cost of production by means of effecting the process of welding in a medium of carbon dioxide.

The continuous welding electrode for welding high-strength steels according to the invention comprises manganese, silicon, iron and the following components taken in percent by weight: carbon, 0.18–0.25; chrome, 1.5–2.0; nickel, 1.0–1.3; tungsten, 0.9–1.3; molybdenum, 0.4–0.5. According to the invention, the manganese is taken in the amount of 2.5–3.5 percent, the silicon in the amount of 0.4–0.8 percent, the iron constituting the remainder. In the proposed continuous welding electrode the increased amount of manganese of up to 2.5–3.5 percent and the decreased amount of silicon of up to 0.4–0.8 percent lead to disintegration of the grains of the cast structure and to an increase of its chemical homogeneity, and this provides for high impact strength of the weld joints operated at temperatures of up to $-100°C$ and also eliminates the formation of hot cracks in the weld joints.

The increased amount of manganese in the electrode reduces the melting point thereof, thus eliminating overheating of the adjacent zone and formation of coarse-grained structure therein, in which case the resistance of the weld joints to formation of cold cracks is increased, therefore, preheating of the articles before welding is no longer necessary.

The welding electrode according to the invention provides for making high-quality weld joints in a medium of carbon dioxide and this allows the cost of the process to be reduced.

The invention will be better understood from a consideration of the following examples of possible compositions of the proposed continuous welding electrode and of its properties.

EXAMPLE 1

$$C = 0.18$$
$$Mn = 2.5$$
$$Si = 0.4$$
$$Cr = 1.5$$
$$Ni = 1.9$$
$$W = 0.9$$
$$Mo = 0.4$$

EXAMPLE 2

$$C = 0.22$$
$$Mn = 3.0$$
$$Si = 0.6$$
$$Cr = 1.8$$
$$Ni = 1.1$$
$$W = 1.1$$
$$Mo = 0.45$$

EXAMPLE 3

$$C = 0.25$$
$$Mn = 3.5$$
$$Si = 0.8$$
$$Cr = 2.0$$
$$Ni = 1.25$$
$$W = 1.3$$
$$Mo = 0.5$$

The characteristics of the weld joints obtained during the welding of steel having the percentage composition: $C = 0.42$, $Cr = 2.0$, $Mn = 1.0$, $Si = 1.2$, $Ni = 1.0$, $Mo = 0.5$, Fe constituting the remainder, are given in the Table below. The thickness of the weld joint is 5 mm and the length of the welding electrode is 5 mm and 20 mm.

TABLE 1

| Mechanical properties and measuring units | Thickness of welded articles | | | | | |
|---|---|---|---|---|---|---|
| | 5 mm | | | 20 mm | | |
| | Composition of welding electrode by Example— | | | Composition of welding electrode by Example— | | |
| | 1 | 2 | 3 | 1 | 2 | 3 |
| Ultimate strength $\delta_f$ kg/mm$^2$ | 188 | 192 | 198 | 160 | 165 | 170 |
| Impact strength by "Menage": | | | | | | |
| $a_n^{+20}$ kg/cm$^2$ | 7 | 6 | 5.5 | 9.0 | 8.5 | 8.0 |
| $a_n^{-70}$ kgm/cm$^2$ | 6 | 5.5 | 5.0 | 8.5 | 8.0 | 7.5 |
| $a_n^{-100}$ kgm/cm$^2$ | 5.5 | 5.0 | 4.5 | 8.0 | 7.5 | 7.0 |
| Impact strength with crack: | | | | | | |
| $^{+20}$ kgm/cm$^2$ | 2.3 | 2.0 | 1.8 | 3.2 | 3.0 | 2.0 |

In Table 2 there are given the characteristics of the weld joints obtained during the welding of steel by the continuous welding electrode having the following percentage composition: C = 0.42, Cr = 2.0, Mn = 1.0, Si = 1.2, Ni = 1.0, Mo = 0.5, Fe constituting the remainder. The welded articles have a thickness of 5 and 20 mm.

TABLE 2

| Mechanical properties and units of measurement | Thickness of welded articles | |
|---|---|---|
| | 5 mm | 20 mm |
| Ultimate strength $\delta_f$ kg/mm$^2$ | 190 | 160 |
| Impact strength by "Menage" | | |
| $A_n^{+20}$ kgm/cm$^2$ | 5 | 6 |
| $A_n^{-70}$ kgm/cm$^2$ | 3 | 4 |
| $A_n^{-100}$ kgm/cm$^2$ | 0.8 | 1.5 |
| Impact strength with a crack | | |
| $^{+20}$ kgm/cm$^2$ | 1.0 | 2.0 |

The ultimate strength of the articles welded by means of the continuous welding electrode of the invention changes depending on the thickness of the welded articles and percentage of carbon in the welding electrode, i.e., the ultimate strength of the weld joint increases together with an increase in the content of carbon and a decrease in the thickness of the articles being welded. At a thickness of the articles being welded of up to 5 mm there is provided an ultimate strength of equal to 190–200 kg/mm$^2$. At a thickness of the articles to be welded of 20 – 50 mm the ultimate strength is higher than 150 kg/mm$^2$. The values of the impact strength by "Menage" of the articles welded by means of the continuous welding electrode of the invention remain almost unchanged at temperatures of up to −100°C, while the impact strength of the articles welded by the known electrode is reduced to 1–2 kgm/cm$^2$ at a temperature of −100°C.

When welding the articles made of high-strength steels by means of the continuous welding electrode of the invention, their resistance to the formation of hot and cold cracks is 1.5–2 times as high as the resistance of the articles welded by means of the continuous welding electrode of the known composition.

We claim:

1. An electrode for continuous welding of high-strength steels consisting essentially of the following components taken in per cent by weight:

carbon 0.18 – 0.25 manganese 2.5 – 3.5 silicon 0.4 – 0.8 chrome 1.5 – 2.0 nickel 1.0 – 1.3 tungsten 0.9 – 1.3 molybdenum 0.4 – 0.5 balance iron.

* * * * *